United States Patent
Baum et al.

(10) Patent No.: US 6,761,450 B1
(45) Date of Patent: Jul. 13, 2004

(54) COMBINATION READING AND MAKEUP GLASSES

(76) Inventors: Richard Baum, 46 Peppermill Rd., Roslyn, NY (US) 11576; Barry Baum, 307 Aerie Ct., Manhasset, NY (US) 11030

(*) Notice: Subject to any disclaimer, the term of this patent is extended or adjusted under 35 U.S.C. 154(b) by 0 days.

(21) Appl. No.: 10/606,488

(22) Filed: Jun. 26, 2003

(51) Int. Cl.[7] .................................................. G02C 9/02
(52) U.S. Cl. .......................................... 351/59; 351/61
(58) Field of Search ............................. 351/41, 59, 61

(56) References Cited

U.S. PATENT DOCUMENTS

| | | | | |
|---|---|---|---|---|
| 3,434,780 A | * | 3/1969 | Bolden | ........................ 351/41 |
| 3,495,898 A | * | 2/1970 | Vecchio | ...................... 351/41 |
| 4,880,302 A | | 11/1989 | Meillet | |
| D304,950 S | | 12/1989 | Guillet | |
| 5,561,481 A | * | 10/1996 | Dileo et al. | .................... 351/59 |

* cited by examiner

Primary Examiner—Huy Mai
(74) Attorney, Agent, or Firm—James A. Quinton

(57) ABSTRACT

Eyeglasses are provided that can function both as make-up glasses and reading glasses. The invention provides an eyeglass frame having a left and right lens support. A nose bridge separates the lens supports. A first lens seats in the left lens support. A second lens seats in the right lens support. Each lens is attached to the lens frame for movement from the left side to the right side of the frame and vise versa to mate with the lens on the opposite side. A first lens and a second lens seat in the left and right lens support. In this position, the eyeglasses function as reading glasses. Since the lenses are movably mounted to the frame, the first lens located on the left side can be moved to sit on top of the second lens on the right side. As a result, there will be no lens on the left side and the eyeglasses can function as make-up glasses. Similarly the second lens located on the right side can be moved to the left side to sit on top of the first lens on the left side. Thus, either side of the face can be made up or a contact lens inserted in either eye while one eye benefits from magnification.

19 Claims, 2 Drawing Sheets

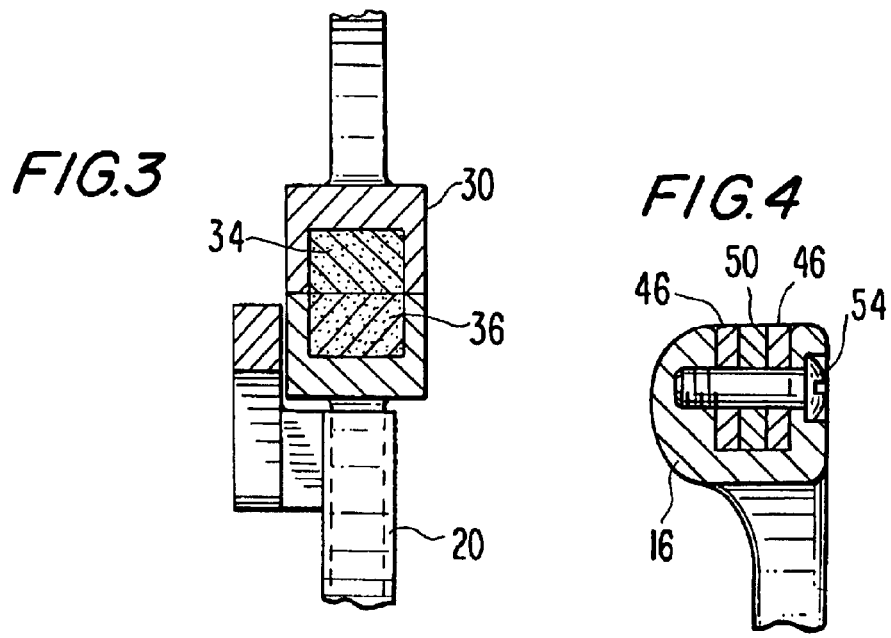
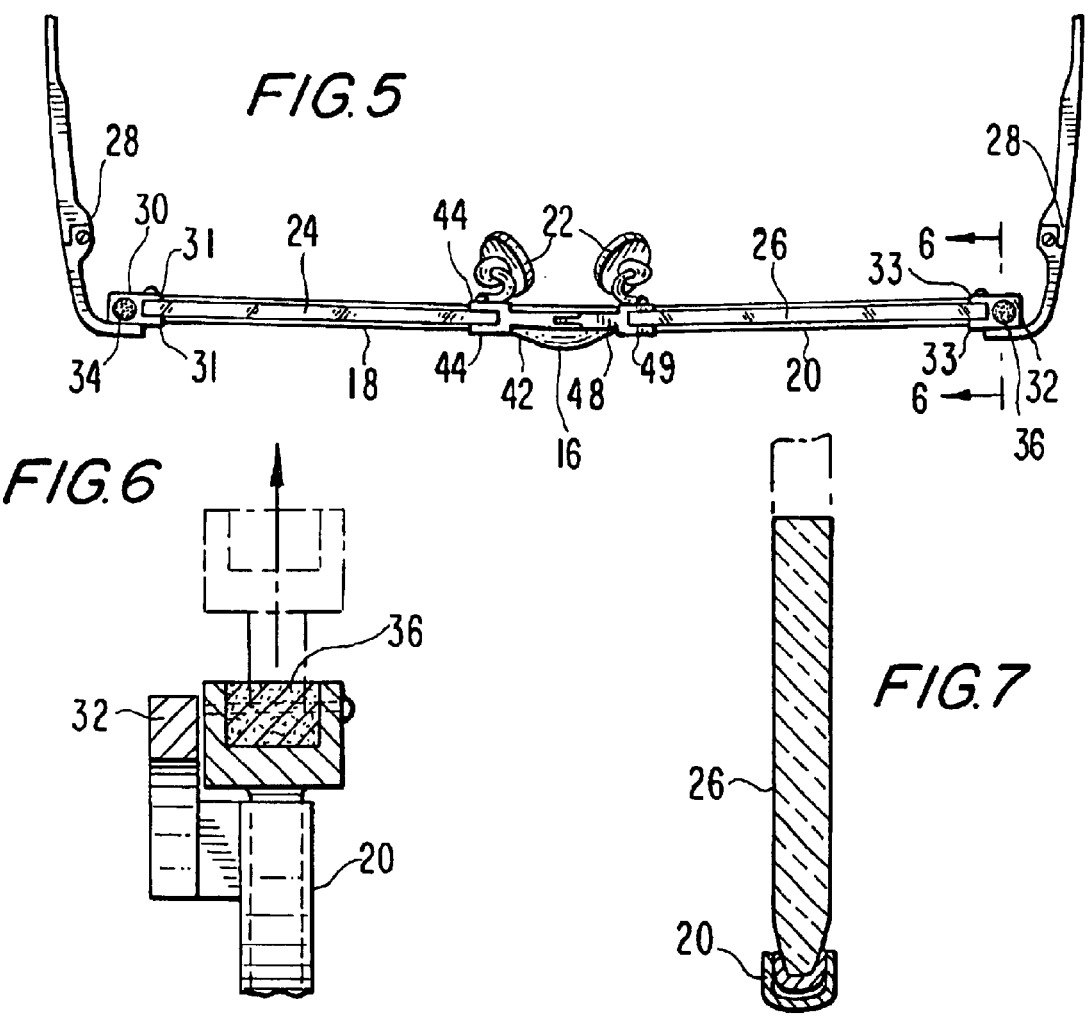

COMBINATION READING AND MAKEUP GLASSES

FIELD OF THE INVENTION

The invention related to eyeglasses. In particular, the invention relates to eyeglasses for near vision use.

BACKGROUND OF THE INVENTION

With the aging of the population, visual acuity suffers. Near vision (presbyopia) becomes a problem with aging. Prior art devices exist which provide a singe lens that can be rotated from eye to eye to apply make-up. See U.S. Pat. No. 4,880,302. While such a device is useful for its intended purpose, it is not useful to read. Reading glasses are known in the art but have drawbacks when used to apply make-up. There is a need for eyewear that is more versatile.

SUMMARY OF THE INVENTION

According to the invention, eyeglasses are provided that can function both as make-up glasses and reading glasses. The invention provides an eyeglass frame having a left and right lens support. A nose bridge separates the lens supports. A first lens seats in the left lens support. A second lens seats in the right lens support. Desirably, each lens is a half lens. Each lens is attached to the lens frame for movement from the left side to the right side of the frame and vice versa to mate with the lens on the opposite side. In use, the first lens and the second lens seat in the left and right lens support. In this position, the eyeglasses function as reading glasses. Since the lenses are movably mounted to the frame, the first lens located on the left side can be moved to sit on top of the second lens on the right side. As a result, there will be no lens on the left side and the eyeglasses can function as make-up glasses. Similarly the second lens located on the right side can be moved to the left side to sit on top of the first lens on the left side. Thus, either side of the face can be made up or a contact lens inserted in either eye while one eye benefits from magnification and the other has no lens obstruction.

In another aspect of the invention, the glasses according to the invention include a frame having a left and right lens support. A nose bridge separating and connecting the left and right lens support is provided. A first lens, preferably a half lens and a second lens, preferably a half lens, are provided for seating in the left and right lens support. A rod is connected to the nose bridge. The first half lens is pivotally attached to the rod so that the lens pivots about the rod. The second half is similarly pivotally attached to the rod to pivot about the rod. As a result, the first lens pivots about the rod to mate with the second lens and form a single lens on the right side lens support as desired. The second lens similarly pivots about the rod to mate with the first lens to form a single lens on the left side. As a result, versatile glasses are provided. In the unpivoted state the glasses function as reading glasses. When either the first or the second side lens are pivoted, a single lens on either left or the right side is provided which can be desirably used to make-up or insert a contact lens.

The preferred embodiment of the present invention is illustrated in the drawings and examples. However, it should be expressly understood that the present invention should not be limited solely to the illustrative embodiment.

BRIEF DESCRIPTION OF THE DRAWINGS

FIG. 3 is a sectional view through 3—3 of FIG. 1.

FIG. 4 is a sectional view through 4—4 of FIG. 1.

FIG. 5 is a sectional view through 5—5 of FIG. 2.

FIG. 6 is a sectional view through 6—6 of FIG. 5.

FIG. 7 is a sectional view through 7—7 of FIG. 2.

DETAILED DESCRIPTION OF THE INVENTION

Figure 1:
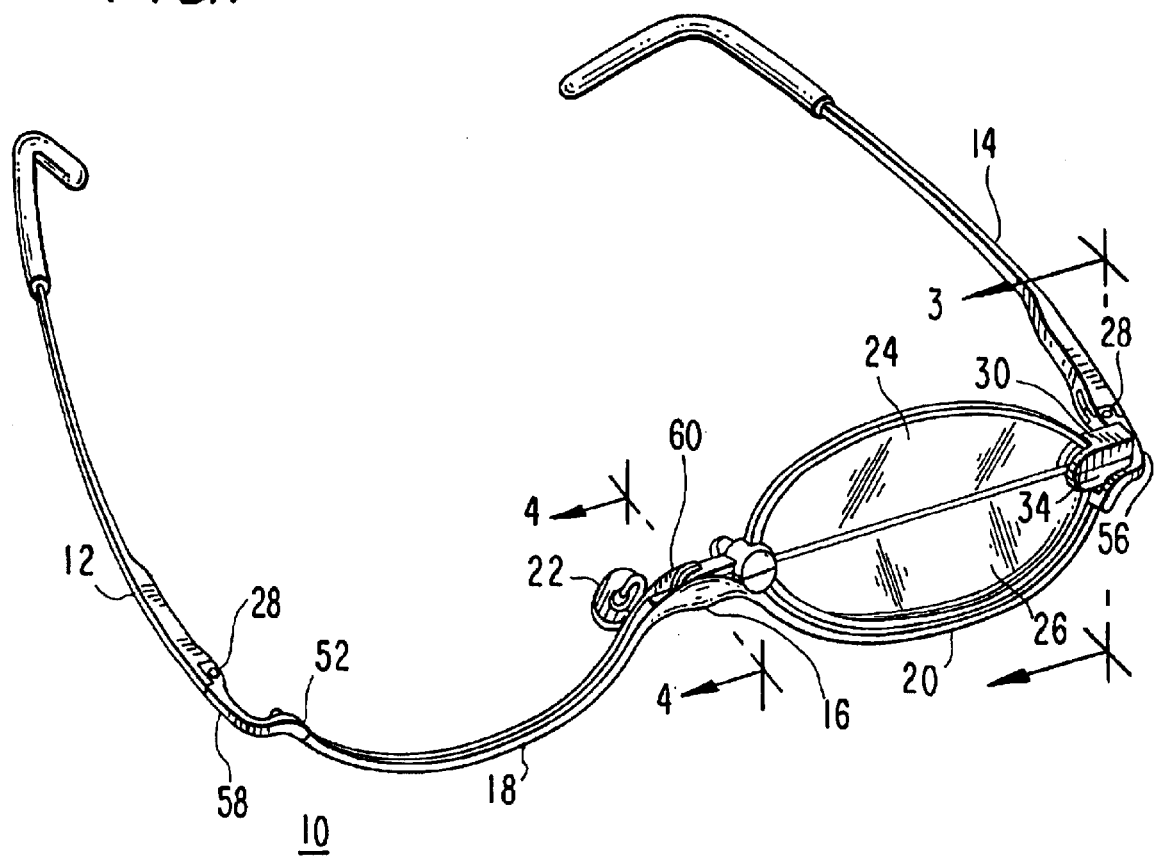
FIG. 1 is a perspective view showing the eyeglasses according to the invention in the make-up mode.

According to the invention, eyeglasses are provided that can function both as make-up glasses and reading glasses. The invention provides an eyeglass frame having a left and right lens support. A nose bridge separates and desirably joins together the lens supports. A first lens seats in the left lens support. A second lens seats in the right lens support. Desirably, each lens is a half lens preferably a prescription lens for far sightedness. Each lens is attached to the lens frame for movement from the left side to the right side of the frame and vice versa to mate with the lens on the opposite side. A first lens and a second lens seat in the left and right lens support. In this position, the eyeglasses function as reading glasses or sewing glasses. Since the lenses are movably mounted to the frame, the first lens located on the left side can be moved to sit on top of the second lens on the right side. As a result, there will be no lens on the left side and the eyeglasses can function as make-up glasses. Similarly the second lens located on the right side can be moved to the left side to sit on top of the first lens on the left side. Thus, either side of the face can be made up or a contact lens inserted in either eye while the other eye benefits from the magnification supplied by the mated lenses.

In another aspect of the invention, the glasses include a frame having a left and right lens support. A nose bridge separating and connecting the left and right lens support is provided. A first lens, preferably a half lens and a second lens, preferably a half lens, are provided for seating in the left and right lens support. Preferably the lenses are prescription lenses, to correct near vision problems or presyopia. Desirably, a pivot rod is located in the nose bridge. The first half lens is pivotally attached to the rod so that the lens pivots about the rod. The second half is similarly pivotally attached to the rod to pivot about the rod. As a result, the first lens pivots about the rod to mate with the second lens and form a single lens on the right side lens support as desired. The second side lens similarly pivots about the rod to mate with the first side lens to form a single lens on the left side. Desirably a connector preferably magnets, a magnet system, VELCRO®, or a mating catch system is provided on each lens to facilitate mating of the lenses. Optionally a finger hold is provided on the outside end of the lenses to allow grasping of the lens without touching the lens and soiling the lens with smudges and fingerprints. Desirably, the catch system functions as the finger hold. As a result, versatile glasses are provided.

In the unpivoted state the glasses function as reading glasses. To convert the glasses to a single eye use, the lens on one side is pivoted to the other side preferably by grasping the finger hold on the lens. The optional connector preferably a magnet on either side of the lens is engaged to securely connect the lenses together and provide a mated lens. When either the first or the second lens are pivoted, a single lens on either left or the right side is provided which can be desirably used to apply make-up or insert a contact lens.

Figure 2:
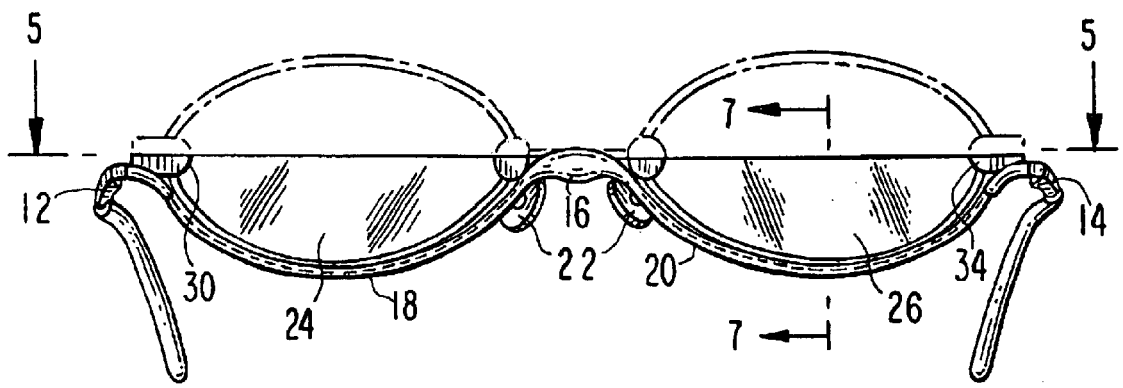
FIG. 2 is a perspective view of the eyeglasses according to invention showing the eyeglasses in the reading glass mode.

Referring to the drawings as best shown in FIGS. 1 through 7, the eyeglasses according to the invention are shown. A frame 10 is provided having a left lens support 18 and a right lens support 20. Left and right temple pieces 12 and 14 are provided for engagement with the users ears. A nose bridge 16 joins the lens support 18 and 20 together and acts to separate the lens support 18 and 20. Optional nose pieces 22 are located on the back of nose bridge 16. As best seen in FIG. 2, a first lens 24 seats in the left lens support 18. A second lens 26 seats in the right lens support 20. This is the normal position for the lenses 24 and 26 when used as reading glasses. Hinges 28 are optionally provided to connect the temple pieces 12 and 14 to the lens supports. As best seen in FIG. 5, an optional keeper 30 having two (2) projections 31 for receiving and holding the lens 24 in place is attached to lens 24 on its outside end. Optionally, the keeper 30 includes a connector for mating with a corresponding connector on lens 26. Preferably, a magnet 34 is provided at the top of keeper 30. The keeper 30 desirably acts as a finger hold to allow handling of the lens by the user without soiling the lens. The keeper 30 includes a flat horizontal bottom which sits on ledge 52 of lens support 18 so that lens 24 is firmly supported in lens support 24. The lens 24 is secured between two projections 31 of keeper 30 by any covenant manner, for example, compression fit, gluing or optionally through screws. According to the invention, a pivot rod is attached to the nose bridge 16 of the glasses 10. Optionally, the pivot rod is a pivot screw 54 located in slot 60 in nose bridge and attached to nose bridge 16 as best seen in FIG. 4. Lens 24 is mounted on its side adjacent to nose bridge 16 to a left side pivot bar 42 having front spaced projections 44 for receipt of the inside portion of the lens. The lens is secured to pivot bar 42 by any convenient manner, for example, a compression fit, gluing or providing a screw through the projections and the lens to secure the lens to the pivot bar. The back of the pivot bar has two parallel projections 46 which have bores through each projection for receipt of pivot rod 54.

Referring to FIG. 2, the right side lens 26 is similarly connected to frame 10 as was the left side lens. On the outside of lens 26, a keeper 32 is provided for holding lens 26. Keeper 32 has two projections 33 for receipt of the lens 26 which can be secured by any convenient manner, for example, compression fit, gluing or screwed through the fork projection and the lens. Desirably, a connector for mating with the connector on lens 24 is provided. Preferably, a magnetic material desirably a magnet 36 is provided at the top of keeper 32. The keeper 32 acts as a finger hold to allow handling of the lens by the user without soiling the lens. A bottom horizontal portion of keeper 32 sits on a ledge on lens support 20 similar to the ledge 52 described in connection with lens 24. As best seen in FIG. 5, on the side of the lens 26 adjacent the nose bridge 16, the lens 26 is secured to a right pivot bar 48 having projections 49 for receipt of lens 26. The right pivot bar 48 secured by any suitable manner, for example, compression fit, glued, screwed or otherwise secured to lens 26. Pivot bar 48 has a back projection 50 having a single central bore for receiving on pivot rod, preferably screw 54 as best seen in FIG. 4. As a result, the lenses 24 and 26 can be independently rotated back and forth around the screw 54.

In operation, as best seen in FIGS. 1 and 2, the lens 24 is rotated about rod 54 by grasping keeper 30 to sit on top of lens 26 to form a single lens on the right hand side as shown in FIG. 1. Magnets 34 and 36 abut and securely hold lens 24 to lens 26. Similarly, the process can be reversed and lens 24 can be the bottom lens sitting in the left side lens support 18 and lens 26 can be rotated into position by grasping keeper 32 and rotating lens 26 about rod 54 so a single lens is formed on the left side. Since magnets 34 and 36 form a firm connection, lenses 24 and 26 can be simultaneously pivoted around rod 54 so that the lenses can be both rotated at the same time. Thus, for example, when both lenses are on the right side, both can be moved to the left side simultaneously and vice versa. As a result, a versatile pair of glasses is provided which can be used as both reading glasses and make-up glasses.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. Eye glasses comprising;
   a) a frame having a left and right lens support;
   b) a nose bridge connecting said left and right lens support;
   c) a first lens and a second lens seating in said left and right lens support;
   d) said first lens movably attached to said frame to move between said left lens support and said second lens;
   e) said second lens movably attached to said lens frame to move between said right lens support and said first lens;
   f) said first lens movable to mate with said second lens to form a single lens on said right lens support;
   g) said second lens moving to mate with said first lens to form a single lens on said left lens support.

2. The eyeglasses according to claim 1 wherein said first and said second lens are half lenses.

3. The eyeglasses according to claim 2 wherein said lenses are magnifying lenses for near vision.

4. The eyeglasses according to claim 3 wherein said lenses are movably attached to said frame through said nose bridge.

5. The eyeglasses according to claim 4 wherein said lenses are rotatably attached to said nose bridge.

6. Eye glasses comprising;
   a) a frame having a left and right lens support and a nose bridge;
   b) said nose bridge connecting said left and right lens support;
   c) a first lens and a second lens for seating in said left and right lens support;
   d) a rod attached to said nose bridge;
   e) said first lens pivotally attached to said rod so that said lens pivots about said rod;
   f) said second lens pivotally attached to said rod;
   g) said first lens pivoting about said rod to mate with said second lens on said right lens support;
   h) said second lens pivoting about said rod to mate with first lens to form a single lens on said left lens support.

7. The eyeglasses according to claim 6 wherein said first lens and said second lens are half lenses.

8. The eyeglasses according to claim 7 wherein said first lens and second lens are magnifying lenses for far sightedness.

9. The eyeglasses according to claim 8 further comprising:
   said first and second lens having an inside end adjacent said nose bridge and an outside end opposed thereto;

a first connector attached to said outside end of said first lens; a second connector attached to said outside end of said second lens;

said first and said second connector interconnecting when said lenses are pivoted to either said left support or said right lens support to firmly mate said first and said second lens.

10. The eyeglasses according to claim 9 further comprising said mated first and second lenses movable from said right lens support to said left lens support and vice versa without separating said lenses.

11. The eyeglasses according to claim 8 further comprising:

said first and second lens having an inside end adjacent said nose bridge and an outside end opposed thereto;

a first magnet attached to said outside end of said first lens;

a magnetic material attached to said outside end of said second lens;

said magnet and said magnetic material contacting when said lenses mate on either said left or said right lens support to firmly mate said first and said second lens.

12. The eyeglasses according to claim 11 wherein said magnetic material is a second magnet.

13. The eyeglasses according to claim 11 wherein said left lens support includes a ledge for receipt of said first magnet and said right lens support includes a ledge for receipt of said magnetic material.

14. The eyeglasses according to claim 13 further comprising:

a first pivot bar having a front end and a back end;

said first pivot bar front end attached to the inside end of said first lens;

said first pivot bar back end having a bore;

a second pivot bar having a front end and a back end;

said second pivot bar front end attached to the inside end of said second lens;

said second pivot bar back end having a bore;

said rod passing through said back end bores in said first and second pivot bars to pivotably mount said first and second lenses to said frame.

15. The eyeglasses according to claim 14 where in said first pivot bar back end has two parallel spaced projections;

each said projection having a bore;

said second pivot bar back end extending between said spaced projection of said first pivot bar;

said first pivot bar bores aligning with said the bore in said second pivot bar to receive said rod.

16. The eyeglasses according to claim 15 further comprising a finger hold attached to said first and second lenses to pivot said lenses without soiling said lens.

17. The eyeglasses according to claim 16 where in said finger holds are attached to the inside end of said first and said second lens.

18. The eyeglasses according to claim 17 where in s aid finger holds are integral with said connector.

19. The eyeglasses according to claim 8 wherein said nose bridge has a slot and said rod is located in said slot.

* * * * *